US006954225B2

United States Patent
Chen

(10) Patent No.: US 6,954,225 B2
(45) Date of Patent: Oct. 11, 2005

(54) METHOD FOR DETECTING MOVING OBJECTS BY COMPARING VIDEO IMAGES

(75) Inventor: Hsiao-Ping Chen, Tao-Yuan Hsien (TW)

(73) Assignee: Huper Laboratories Co., Ltd., Taipei (TW)

( * ) Notice: Subject to any disclaimer, the term of this patent is extended or adjusted under 35 U.S.C. 154(b) by 674 days.

(21) Appl. No.: 10/063,322

(22) Filed: Apr. 11, 2002

(65) Prior Publication Data

US 2002/0180870 A1 Dec. 5, 2002

(30) Foreign Application Priority Data

Apr. 13, 2001 (TW) .......................... 90108898 A

(51) Int. Cl.$^7$ .............................................. H04N 7/18
(52) U.S. Cl. .................. 348/207.99; 348/152; 382/107
(58) Field of Search ............... 348/155, 152, 348/143, 360; 382/107, 236, 274, 192, 173, 103; 340/567, 511

(56) References Cited

U.S. PATENT DOCUMENTS

| | | | | |
|---|---|---|---|---|
| 5,151,945 A | * | 9/1992 | Lee et al. .................. 382/103 |
| 5,548,659 A | * | 8/1996 | Okamoto ................... 382/107 |
| 5,731,832 A | * | 3/1998 | Ng ............................ 348/155 |
| 5,937,092 A | * | 8/1999 | Wootton et al. ........... 382/192 |
| 6,104,831 A | * | 8/2000 | Ruland ...................... 382/173 |
| 6,130,717 A | * | 10/2000 | Arai et al. ................. 348/360 |
| 6,396,534 B1 | * | 5/2002 | Mahler et al. ............. 348/155 |

* cited by examiner

*Primary Examiner*—Tuan Ho
*Assistant Examiner*—Brian Jelinek
(74) *Attorney, Agent, or Firm*—Winston Hsu

(57) ABSTRACT

A method detects activity within a fixed view by comparing first and second images. The first and second images respectively include a plurality of blocks, and each of the blocks having a plurality of pixels. The method including: calculating an average value A for each block of the second image, each of the average values A is equal to an average of differences between pixels of one of the blocks of the second image and pixels of a corresponding block of the first image; calculating a mean difference B between average pixel values of the first and second images; calculating a difference V between average value A and mean difference B for each block of the second image, and selecting blocks of the second image that have corresponding differences V greater than a threshold value; and determining whether there is any object moving within the fixed view according to the selected blocks.

20 Claims, 14 Drawing Sheets

| 57 | 35 | 46 | 42 | 64 | 58 | 64 | 47 |
|----|----|----|----|----|----|----|----|
| 51 | 57 | 56 | 31 | 72 | 44 | 41 | 45 |
| 69 | 73 | 50 | 38 | 46 | 64 | 32 | 49 |
| 53 | 42 | 66 | 52 | 48 | 62 | 55 | 52 |
| 54 | 36 | 64 | 54 | 70 | 58 | 37 | 51 |
| 59 | 44 | 62 | 56 | 36 | 48 | 49 | 57 |

First image [Mg(m,n)]  (124)

| 90 | 71 | 75 | 69 | 95 | 84 | 105 | 94 |
|----|----|----|----|----|----|-----|----|
| 87 | 85 | 90 | 66 | 106 | 72 | 80 | 83 |
| 101 | 109 | 78 | 73 | 76 | 99 | 64 | 88 |
| 88 | 76 | 96 | 83 | 79 | 81 | 85 | 87 |
| 85 | 67 | 98 | 74 | 102 | 93 | 74 | 82 |
| 92 | 76 | 93 | 84 | 63 | 75 | 86 | 83 |

Second image [Mh(m,n)]  (126)

| 33 | 36 | 29 | 27 | 31 | 26 | 41 | 37 |
|----|----|----|----|----|----|----|----|
| 36 | 28 | 34 | 35 | 34 | 28 | 39 | 38 |
| 32 | 36 | 28 | 35 | 30 | 35 | 32 | 39 |
| 35 | 34 | 30 | 31 | 31 | 19 | 30 | 35 |
| 31 | 31 | 34 | 20 | 32 | 35 | 37 | 31 |
| 33 | 32 | 31 | 28 | 27 | 27 | 37 | 26 |

Average value table [A(m,n)]  (142)

| 1 | 4 | 3 | 5 | 1 | 6 | 9 | 5 |
|---|---|---|---|---|---|---|---|
| 4 | 4 | 2 | 3 | 2 | 4 | 7 | 6 |
| 0 | 4 | 4 | 3 | 2 | 3 | 0 | 7 |
| 3 | 2 | 2 | 1 | 1 | 13 | 2 | 3 |
| 1 | 1 | 2 | 12 | 0 | 3 | 5 | 1 |
| 1 | 0 | 1 | 4 | 5 | 5 | 5 | 6 |

Contrast table [V(m,n)]  (144)

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Flag table (S=13)  (146)

Fig. 9

| 57 | 35 | 46 | 42 | 64 | 58 | 64 | 47 | 56 | 44 | 53 | 48 | 53 | 60 | 62 | 59 |
|---|---|---|---|---|---|---|---|---|---|---|---|---|---|---|---|
| 51 | 57 | 56 | 31 | 72 | 44 | 41 | 45 | 57 | 62 | 52 | 36 | 76 | 53 | 50 | 53 |
| 69 | 73 | 50 | 38 | 46 | 64 | 32 | 49 | 67 | 79 | 58 | 39 | 55 | 79 | 40 | 68 |
| 53 | 42 | 66 | 52 | 48 | 62 | 55 | 52 | 49 | 46 | 52 | 61 | 65 | 88 | 90 | 89 |
| 54 | 36 | 64 | 54 | 70 | 58 | 37 | 51 | 54 | 39 | 67 | 55 | 83 | 92 | 82 | 80 |
| 59 | 44 | 62 | 56 | 36 | 48 | 49 | 57 | 55 | 56 | 63 | 48 | 43 | 90 | 86 | 88 |

First Image (Mg(m,n))  Second Image (Mf(m,n))

| 1 | 9 | 7 | 6 | 11 | 2 | 2 | 12 | 11 | 3 | 5 | 6 | 1 | 10 | 10 | 0 |
|---|---|---|---|---|---|---|---|---|---|---|---|---|---|---|---|
| 6 | 5 | 4 | 5 | 4 | 9 | 9 | 8 | 6 | 7 | 8 | 7 | 8 | 3 | 3 | 4 |
| 2 | 6 | 8 | 1 | 9 | 15 | 8 | 19 | 10 | 6 | 4 | 11 | 3 | 3 | 4 | 7 |
| 4 | 4 | 6 | 9 | 17 | 26 | 35 | 37 | 8 | 8 | 6 | 3 | 5 | 14 | 23 | 25 |
| 0 | 3 | 3 | 1 | 13 | 34 | 45 | 29 | 12 | 9 | 9 | 11 | 1 | 22 | 33 | 17 |
| 4 | 12 | 1 | 8 | 7 | 42 | 37 | 31 | 8 | 0 | 11 | 4 | 5 | 30 | 25 | 19 |

Average value table (A(m,n))    Contrast table (V(m,n))

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 1 | 1 | 1 |
| 0 | 0 | 0 | 0 | 0 | 1 | 1 | 1 |
| 0 | 0 | 0 | 0 | 0 | 1 | 1 | 1 |

Flag table (S=13)

Fig. 10

| 57 | 35 | 46 | 42 | 64 | 58 | 64 | 47 | 56 | 44 | 53 | 48 | 53 | 60 | 62 | 59 |
|---|---|---|---|---|---|---|---|---|---|---|---|---|---|---|---|
| 51 | 57 | 56 | 31 | 72 | 44 | 41 | 45 | 57 | 62 | 52 | 36 | 76 | 53 | 50 | 53 |
| 69 | 73 | 50 | 38 | 46 | 64 | 32 | 49 | 67 | 79 | 58 | 39 | 55 | 79 | 40 | 68 |
| 53 | 42 | 66 | 52 | 48 | 62 | 55 | 52 | 49 | 46 | 52 | 61 | 65 | 88 | 90 | 89 |
| 54 | 36 | 64 | 54 | 70 | 58 | 37 | 51 | 54 | 39 | 67 | 55 | 83 | 92 | 82 | 80 |
| 59 | 44 | 62 | 56 | 36 | 48 | 49 | 57 | 55 | 56 | 63 | 48 | 43 | 90 | 86 | 88 |

First image [Mg(m,n)]　　　　Second image [Mf(m,n)]

| 1 | 9 | 7 | 6 | 11 | 2 | 2 | 12 | 11 | 3 | 5 | 6 | 1 | 10 | 10 | 0 |
|---|---|---|---|---|---|---|---|---|---|---|---|---|---|---|---|
| 6 | 5 | 4 | 5 | 4 | 9 | 9 | 8 | 6 | 7 | 8 | 7 | 8 | 3 | 3 | 4 |
| 2 | 6 | 8 | 1 | 9 | 15 | 8 | 19 | 10 | 6 | 4 | 11 | 3 | 3 | 4 | 7 |
| 4 | 4 | 6 | 9 | 17 | 26 | 35 | 37 | 8 | 8 | 6 | 3 | 5 | 14 | 23 | 25 |
| 0 | 3 | 3 | 1 | 13 | 34 | 45 | 29 | 12 | 9 | 9 | 11 | 1 | 22 | 33 | 17 |
| 4 | 12 | 1 | 8 | 7 | 42 | 37 | 31 | 8 | 0 | 11 | 4 | 5 | 30 | 25 | 19 |

Average value table [A(m,n)]　　　　Contrast table [V(m,n)]

| 1.18 | 0.32 | 0.54 | 0.64 | 0.11 | 1.07 | 1.07 | 0 | 0 | 0 | 0 | 0 | 0 | 0 | 0 | 0 |
|---|---|---|---|---|---|---|---|---|---|---|---|---|---|---|---|
| 0.46 | 0.75 | 0.86 | 0.75 | 0.86 | 0.32 | 0.32 | 0.43 | 0 | 0 | 0 | 0 | 0 | 0 | 0 | 0 |
| 1.07 | 0.64 | 0.43 | 1.18 | 0.32 | 0.32 | 0.43 | 0.75 | 0 | 0 | 0 | 0 | 0 | 0 | 0 | 0 |
| 0.86 | 0.86 | 0.64 | 0.32 | 0.54 | 1.50 | 2.47 | 2.68 | 0 | 0 | 0 | 0 | 0 | 1 | 1 | 1 |
| 1.29 | 0.96 | 0.96 | 1.18 | 0.11 | 2.36 | 3.54 | 1.82 | 0 | 0 | 0 | 0 | 0 | 1 | 1 | 1 |
| 0.86 | 0 | 1.18 | 0.43 | 0.54 | 3.22 | 2.68 | 2.64 | 0 | 0 | 0 | 0 | 0 | 1 | 1 | 1 |

Standard deviation table　　　　Flag table (S3=1.2)

Fig. 13

METHOD FOR DETECTING MOVING OBJECTS BY COMPARING VIDEO IMAGES

BACKGROUND OF INVENTION

1. Field of the Invention

The present invention relates to a method for detecting moving objects, and more particularly, to a method for detecting moving objects by comparing video images.

2. Description of the Prior Art

A prior art method for detecting moving objects determines with the help of a calculator whether there is any object moving. This method is used for comparing video images generated by a camera. The calculator can select a first image and a second image from the video images and compare the images with each other so as to determine if any moving object exists. In general, when there is an object moving within the view filmed by the camera, pixels of the video images vary with movement of the object. Therefore, the calculator can determine whether there is any object moving within the view filmed by the camera according to the variation of pixels of the first image and the second image.

Please refer to FIG. 1 and FIG. 2. FIG. 1 is a monitor system 50 according to the prior art. FIG. 2 is a block diagram of the monitor system 50 shown in FIG. 1. The monitor system 50 is used for detecting whether any moving object exists within the view 52 by using a predetermined detection method. The monitor system 50 comprises a camera 20 for filming the view 52 to generate a plurality of video images 22 and a calculator 30 for selecting a first image 24 and a second image 26 from the video images 22. The calculator 30 compares the second image 26 with the first image 24 according to the predetermined detection method so as to determine whether any moving object exists within the view 52. When the calculator 30 determines whether any moving object exists within the view 52, the calculator 30 compares each pixel of the first image 24 with a corresponding pixel of the second image 26 so as to count a total number of different pixels between the two images 24, 26. If the total number of different pixels is greater than a predetermined number, the monitor system 50 determines that there is at least one object moving within the view 52. Oppositely, if the total number of different pixels is not greater than the predetermined number, the monitor system 50 determines that there is no object moving within the view 52.

However, the method adopted by the monitor system 50 for detecting moving objects within the view 52 has an obvious disadvantage in that the monitor system 50 may incorrectly judge when the global environment of the view 52 is changed suddenly. For example, when the view 52 is suddenly illuminated by a light source, i.e. a light bulb, the calculator 30 selects a video image 22 generated before the light source illuminated the view 52 as the first image 24 and selects another video image 22 generated when the light source illuminates the view 52 as the second image 24. And, during the time interval between when the camera 20 generates the first image 24 and the second image 26, there is not any object moving within the view 52. Because the second image 26 is generated when the view 52 is illuminated, most of the pixels of the second image 26 have greater brightness than the corresponding pixels of the first image 24. The total number of different pixels between the two images 24, 26, thus, increases substantially, and the monitor system 50 makes a wrong determination.

SUMMARY OF INVENTION

It is therefore a primary objective of the claimed invention to provide a method for detecting moving objects within a fixed view with global insensitivity.

The method is used for detecting activity within a fixed view by using a monitor system. The monitor system comprises a camera for filming the fixed view at a predetermined camera speed and a calculator for detecting the activity within the fixed view according to a first image and a second image generated by the camera. The second image is generated within a predetermined time interval after the first image is generated. Each of the images generated by the camera comprises a plurality of blocks, and each of the blocks comprises a plurality of pixels.

The method comprises: 1. calculating an average value A for each block of the second image, each of the average values A is equal to an average of differences between pixels of one of the blocks of the second image and pixels of a corresponding block of the first image; 2. calculating a mean difference B between an average value of pixels of the first image and an average value of pixels of the second image; 3. calculating a difference between the average value A and the mean difference B for each block of the second image, and selecting blocks of the second image that have corresponding differences greater than a threshold value; and 4. determining whether there is any object moving within the fixed view according to the selected blocks.

It is an advantage of the claimed invention to qualify the global environment effects as the mean difference B. The monitor system adopting the method of the claimed invention can detect moving objects with global insensitivity.

BRIEF DESCRIPTION OF DRAWINGS

FIG. 9 represents a scene upon occurrence of a global change.

FIG. 10 represents a scene upon movement of an object near a right-bottom corner of the view.

FIG. 13 represents a scene upon movement of an object near the right-bottom corner of the view.

DETAILED DESCRIPTION

Figure 1:
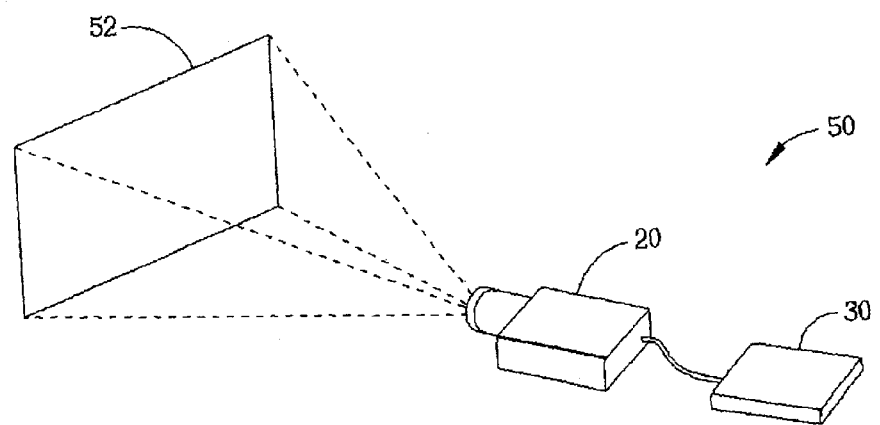
FIG. 1 is a monitor system according to the prior art.
Figure 2:
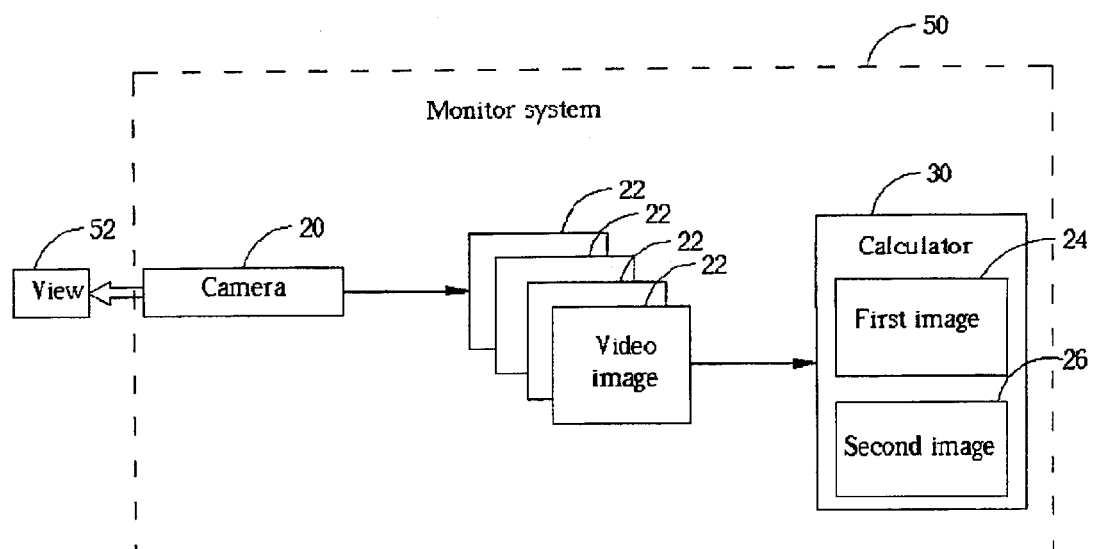
FIG. 2 is a block diagram of the monitor system shown in FIG. 1.
Figure 3:
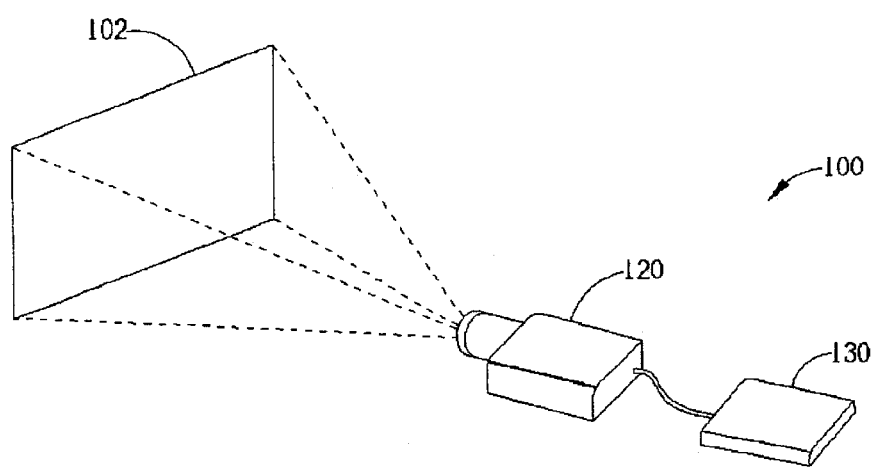
FIG. 3 is a monitor system adopting the method of the present invention.
Figure 4:
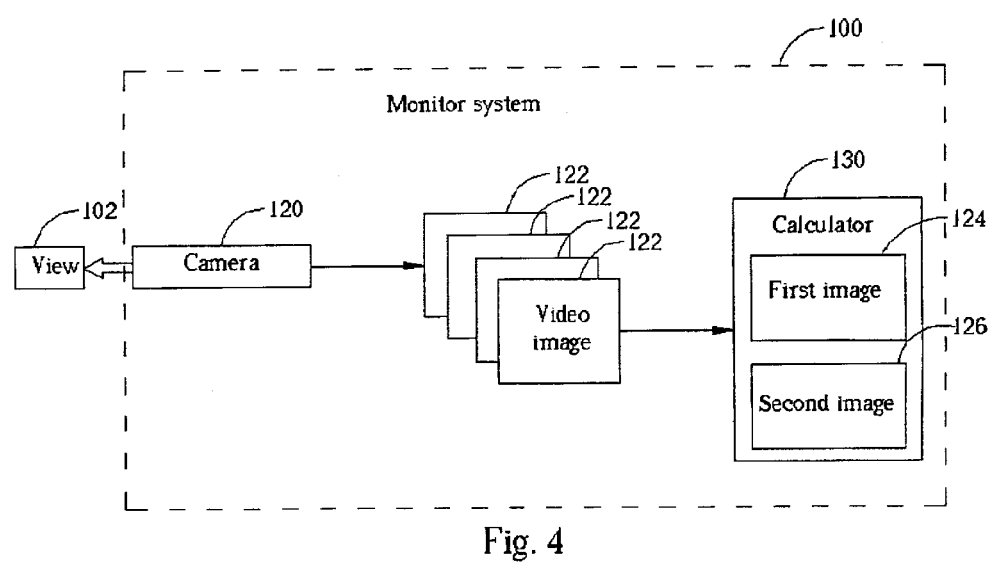
FIG. 4 is a block diagram of the monitor system shown in FIG. 3.

Please refer to FIG. 3 and FIG. 4. FIG. 3 is a monitor system 100 adopting the method of the present invention.

FIG. 4 is a block diagram of the monitor system 100 shown in FIG. 3. The monitor system 100 is used for detecting moving objects in a fixed view 102, and comprises a camera 120 for filming the fixed view 102 to generate a plurality of video images 122 at a predetermined camera speed, i.e. thirty video images 122 per second, and a calculator 130 for selecting a first image 124 and a second image 126 from the video images 122. After the first image 124 is generated, the camera 120 generates the second image 126 within a predetermined time interval. The calculator 130 adopts the method of the present invention to compare the first image 124 with the second image 126 so as to detect whether there is any moving object within the view 102.

Figure 5:
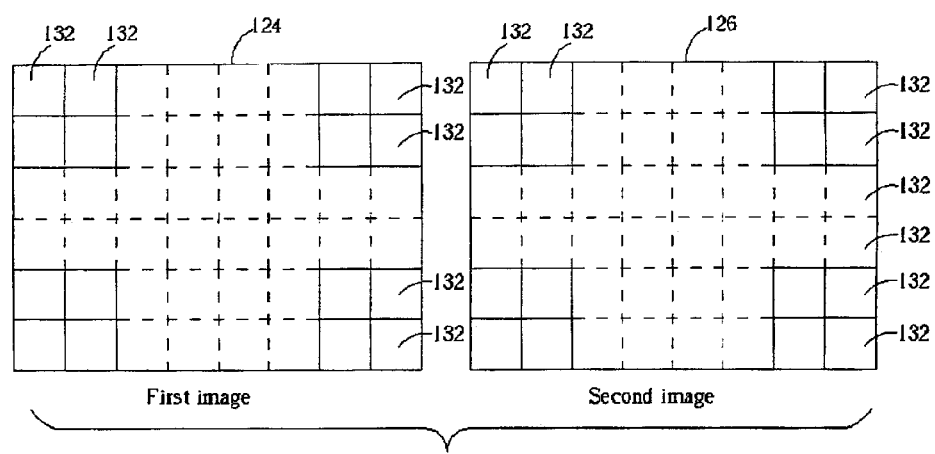
FIG. 5 is a schematic diagram of a first image and a second image.
Figure 6:
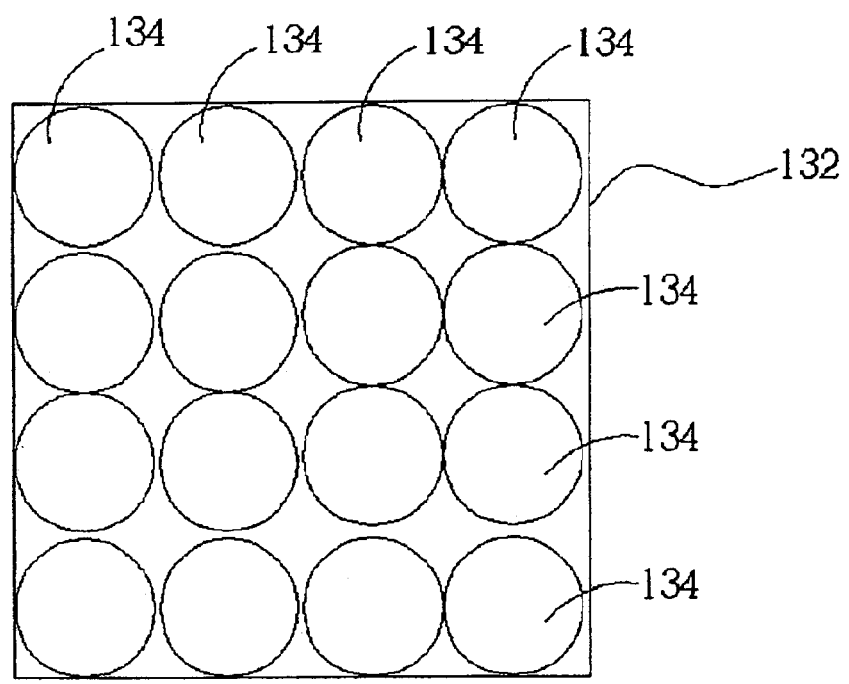
FIG. 6 is a schematic diagram of a block shown in FIG. 5.

Please refer to FIG. 5 and FIG. 6. FIG. 5 is a schematic diagram of the first image 124 and the second image 126. FIG. 6 is a schematic diagram of a block 132 shown in FIG. 5. When the calculator 130 compares the first image 124 with the second image 126, the first image 124 and the second image 126 are separated into a plurality of blocks 132 having the same size. Each of the blocks 132 comprises a plurality of pixels 134.

Figure 7:
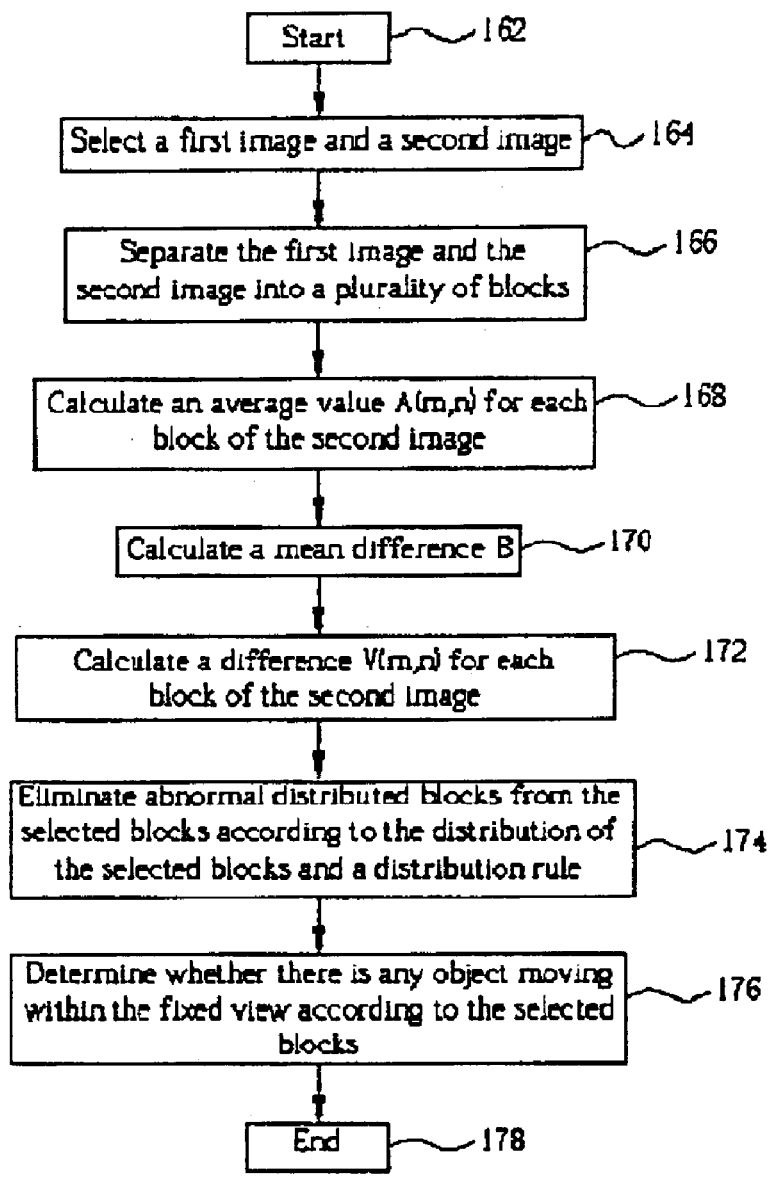
FIG. 7 is a flowchart of a method according to a first embodiment of the present invention.

Please refer to FIG. 7. FIG. 7 is a flowchart of a method according to a first embodiment of the present invention. The method comprises:

Step 162: Start;

Step 164: Select a first image 124 and a second image 126 from the video image 122;

Step 166:

Separate the first image 124 and the second image 126 into a plurality of blocks 132;

Step 168:

Calculate an average value A(m,n) for each block 132 of the second image 126, each of the average values A(m,n) is equal to the average of the differences between the pixels 134 of one of the blocks 132 of the second image 126 and the pixels 134 of a corresponding block 132 of the first image 124;

Step 170:

Calculate a mean difference B between an average value of the pixels 134 of the first image 124 and an average value of the pixels 134 of the second image 126;

Step 172:

Calculate a difference V(m,n) between the average value A(m,n) and the mean difference B for each block 132 of the second image 126, and select the blocks 132 of the second image 126 that have corresponding differences V(m,n) greater than a threshold value S;

Step 174:

Eliminate abnormal distributed blocks 132 from the selected blocks 132 according to the distribution of the selected blocks 132 and a distribution rule;

Step 176:

Determine whether there is any object moving within the fixed view 102 according to the selected blocks 132; and Step 178: End.

The major difference between the method according to the present invention and the prior art method is that the monitor system 100 quantifies the global environment effects. When the monitor system 100 compares the first image 124 with the second image 126, the calculator 130 calculates the mean difference B between the average value of the pixels 134 of the first image 124 and the average value of the pixels 134 of the second image 126. The mean difference B is taken as the quantified global environment effects. After the mean difference B is calculated, the monitor system 100 subtracts the mean difference B from each of the average values A(m,n) of the blocks 132, and then calculates the absolute value of the result to obtain the differences V(m,n) for each block 132 of the second image 126. Finally, the calculator 130 can determine whether there is any object moving in the view 102 according to the differences V(m,n) of all blocks 132. The monitor system 100, thus, can eliminate the influence of the global environment effects by subtracting the mean difference B from the average values A(m,n), i.e. Step 170 and Step 172. In contrast to the prior art, the monitor system 100 detects the moving objects accurately even when the global environment of the view 102 is suddenly changed.

Figure 8:
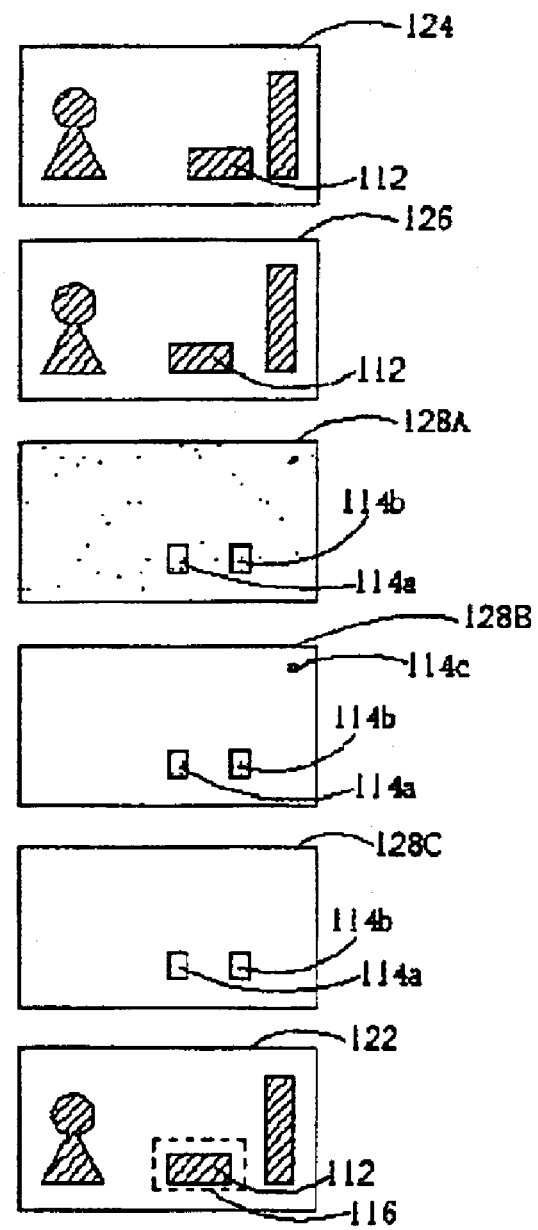
FIG. 8 depicts corresponding images when the first image is compared with the second image.

Please refer to FIG. 8. FIG. 8 depicts corresponding images when the first image 124 is compared with the second image 126. When the first image 124 and the second image 126 are generated, an object 112 is moving within the view 102. A first contrast image 128A is taken as a reference for comparing the first image 124 and the second image 126, and is generated by subtracting the first image 124 from the second image 126 pixel by pixel. The average values A(m, n) of the second image 126 and the mean difference B can be calculated not only according to the pixels 134 of the first image 124 and the second image 126, but also according to the pixels of the first contrast image 128A. The procedure for calculating the average values A(m,n) and the mean difference B will be explained in more detail later. FIG. 8 also depicts a second contrast image 128B, which is generated by the calculator 130. In order to generate the second contrast image 128B, the calculator 130 selects the blocks 132 of the second image 126 that have corresponding differences V(m, n) greater than a threshold value S, and then generates the second contrast image 128B according to the distribution of the selected blocks 132. The second contrast image 128B comprises three areas 114a, 114b, and 114c. Each of the areas 114a, 114b, and 114c is composed of a plurality of the selected blocks 132. The two areas 114a and 114b are caused by movement of the object 112, and the area 114c is caused by noise of the monitor system 110. Because the area 114c is not caused by the movement of the object 112, the calculator 130 should eliminate abnormal distributed blocks 132 from the selected blocks 132 according to the distribution of the selected blocks 132 and a predetermined distribution rule. In other words, the calculator 130 then selects the blocks 132 of the two area 114a and 114b and eliminates the blocks 132 of the area 114c so as to generate a third contrast image 128C containing the two areas 114a and 114b without the area 114c. The calculator 130 can determine that there is an object 112 moving within the view 102 according to the two areas 114a and 114b. In addition, the calculator 130 can determine a moving area 116 according to the distribution of the two areas 114a and 114b. The moving area 116 circles the object 112 to indicate its location. Furthermore, the monitor system 100 can repeat above processes to compare the video images 122 so as to determine the location of the object 116 at corresponding times. The monitor system, thus, can trace the moving object 112.

To describe the process of the calculator 130 in more detail, some equations are used later. In this embodiment, the resolution of the video images 122 is 320 pixels×240 pixels. A equation g(i,j) is used for representing all of the pixels 134 of the first image 124, and another equation f(i,j) is used for representing all of the pixels 134 of the second image 126. Each of the pixels 134 comprises a plurality of image parameters, such as brightness, gray level, and color temperature etc., and the values of the g(i,j) and f(i,j) are calculated according to at least one of the image parameters. For example, the first image and the second image are RGB video images. For obtaining the values of the g(i,j) and f(i,j), the calculator 130 transforms the two image 124 and 126 into two corresponding black-and-white video images, and then calculates a corresponding representation value for each pixels 134 according to the gray levels of the pixels of the two black-and-white video images. The two equations g(i,j) and f(i,j) are used for representing the representation value of each pixels 134 of the first image 124 and the second image 126. Therefore, the first image 124 can be represented as:

$g(i,j), 1 \leq i \leq 320$ and $1 \leq j \leq 240$, and the second image 126 can be represented as:

$f(i,j), 1 \leq i \leq 320$ and $1 \leq j \leq 240$.

For example, g(1, 1) and f(1, 1) are respectively used for representing the most left-top pixels 124 of the first image 124 and the second image 126, and g(320,240) and f(320, 240) are respectively used for representing the most right-bottom pixels 124 of the first image 124 and the second image 126. Different combinations of the values of two parameters i and j for the two equations g(i,j) and f(i,j) correspond to different pixels 134 of the first image 124 and the second image 126. The difference diff(i,j) between one of the pixels 134 of the first image 124 and the corresponding pixel 134 of the second image 126 is expressed as the equation below:

$\text{diff}(i,j) = |g(i,j) - f(i,j)|$

Hence, the first contrast image 128A can be represented as a set of the differences diff(i,j), and is expressed as the equation below:

$\text{diff}(i,j) = |g(i,j) - f(i,j)|$, $1 \leq i \leq 320$ and $1 \leq j \leq 240$ As illustrated previously, the mean difference B can be calculated not only according to the pixels 134 of the first image 124 and the second image 126, but also according to the pixels of the first contrast image 128A. This signifies that the mean difference B can be expressed as the equation below:

$$B = \text{average}(\text{sum}[\text{diff}(i, j)]) = \left( \sum_{i=1}^{320} \sum_{j=1}^{240} (|g(i, j) - f(i, j)|) \right) \Big/ (320 \times 240)$$

In addition, the calculator 130 respectively separates the first image 124 and the second image 126 into a plurality of blocks 132. Each of the blocks 132 comprises sixteen pixels 134. Therefore, the first image 124 and the second image 126 respectively comprise 4,800 (i.e. 80×60) blocks 132. Each of the average values A (m,n) is equal to the average of the differences between pixels 134 of one of the blocks 132 of the second image 126 and pixels 134 of a corresponding block 132 of the first image 124. In order to calculate the average value A(m,n) for each block 132 of the second image 126, the calculator 130 subtracts a sum of the values of f(i,j) of a corresponding block 132 from a sum of the values of g(i,j) of the block 132, and then divides the result by the number of pixels of the block, i.e. sixteen. The variable m of the average value A(m,n) is an integer from zero to 79, and the other variable n of the average value A(m,n) is an integer from zero to 59. Every block 132 of the second image 126 has a unique combination of the two variables m and n. For example, when m=0 and n=0, A(m,n)=A(0,0), where A(0,0) is the average value of the most left-top block 132 of the second image 126. When m=79 and n=59, A(m,n)=A(79,59), where A(79,59) is the average value of the most right-bottom block 132 of the second image 126. Hence, the average value A(m,n) for each block 132 of the second image 126 is expressed as the equation below:

$$A(m, n) = \text{average}(\text{sum}[\text{diff}(4m+r, 4n+s)]) = \sum_{r=1}^{4} \sum_{s=1}^{4} \text{diff}(4m+r, 4n+s)/16$$

where m, n, i, and j are integers, and $0 \leq m \leq 79$, $0 \leq n \leq 59$, $1 \leq r \leq 4$, $1 \leq s \leq 4$ Because each of the average values A(m,n) is equal to the average of the differences between pixels 134 of one of the blocks 132 of the second image 126 and pixels 134 of a corresponding block 132 of the first image 124, and the mean difference B is equal to the difference between an average value of pixels 134 of the first image 124 and an average value of pixels 134 of the second image 126, the mean difference B is also expressed as the equation below:

$$B = \left( \sum_{m=0}^{79} \sum_{n=0}^{59} A(m, n) \right) \Big/ (80 \times 60)$$

The number of the blocks 132 that every video image 122 comprises influences the sensitivity of the monitor system 100 for detecting moving objects and the processing time for comparing the video images 122. The more blocks 132 each video image 122 has, the more sensitive the monitor system 100 is and the more processing time is spent for comparing the video images 122. For different users demands, the manufacturer can change the total number of the blocks 132 of each video image 122 and the number of the pixels 134 of each block 132. For example, the calculator 130 can respectively separate the first image 124 and the second image 126 into forty eight blocks 132, where each of the blocks 132 comprises 1,600 (i.e. 40×40) pixels 134, so as to increase the comparison speed of the monitor system 100, and meanwhile the average value A(m,n) for each block 132 of the second image 126 is expressed as the equation below:

$$A(m, n) = \text{average}(\text{sum}[\text{diff}(40m+r, 40n+s)]) = \sum_{r=1}^{40} \sum_{s=1}^{40} \text{diff}(40m+r, 40n+s)/1600$$

where m, n, i, and j are integers, and $0 \leq m \leq 7$, $0 \leq n \leq 5$, $1 \leq r \leq 40$, $1 \leq s \leq 40$, and the mean difference B is expressed as the equation below:

$$B = \left( \sum_{m=0}^{7} \sum_{n=0}^{5} A(m, n) \right) \Big/ (8 \times 6)$$

After the average values A(m,n) and the mean difference B are obtained, the calculator 130 calculates a difference V(m,n) between the average value A and the mean difference B for each block 132 of the second image 126. Each of the differences V(m,n) is equal to |A(m,n)−B|

The calculator 130 selects the blocks 132 of the second image 126 that have corresponding differences V(m,n) greater than a threshold value S to determine whether there is any object moving within the fixed view 102. Please refer to FIG. 9. FIG. 9 represents a scene upon the occurrence of a global change. In this embodiment, the first image 124 and the second image 126 are respectively separated into forty-eight blocks 132, where each of the blocks 132 comprises 1,600 pixels. Of course, other methods for separating the images are available for the present invention. For example, the first image 124 and the second image 126 can be respectively separated into 4,800 blocks 132, where each of the blocks 132 comprises sixteen pixels 134. The numbers indicated in the blocks 132 of the first image 124 are the mean values Mg(m,n) of the first image 124. Each of the mean values Mg(m,n) corresponds to one of the blocks 132 of the first image 124, and is equal to the average of the representation values g(i,j) of the pixels 134 in the corresponding block 132. The numbers indicated in the blocks 132 of the second image 126 are the mean values Mf (m,n) of the second image 124. Each of the mean values Mf(m,n) corresponds to one of the blocks 132 of the first image 124, and is equal to the average of the representation values f(i,j) of the pixels 134 in the corresponding block 132. The variable m is an integer from zero to seven, and the other variable n is an integer from zero to five. Every block 132 in the same video image has a unique combination of the two variables m and n. For example, when m=0 and n=0, Mg(m,n)=Mg(0,0), where Mg(0,0) is the mean value of the presentation values g(i,j) of the pixels 134 of the most left-top block 132 of the first image 124. When m=79 and n=59, Mg(m,n)=Mg (79,59), where Mg(79,59) is the mean value of the presentation values g(i,j) of the pixels 134 of the most right-bottom block 132 of the first image 124. Hence, the mean values Mg(m,n) and Mf(m,n) for each block 132 of the first image 124 and the second image 126 are expressed as the equations below:

$$Mg(m, n) = \text{average}[g(40m+r, 40n+s)] = \sum_{r=1}^{40}\sum_{s=1}^{40} g(40m+r, 40n+s)/1600$$

$$Mf(m, n) = \text{average}[f(40m+r, 40n+s)] = \sum_{r=1}^{40}\sum_{s=1}^{40} f(40m+r, 40n+s)/1600$$

where m, n, i, and j are integers, and $$0 \leq m \leq 7, 0 \leq n \leq 5, 1 \leq r \leq 40, 1 \leq s \leq 40.$$

Therefore, the following equations can be deduced:

$$A(m, n) = \sum_{r=1}^{40}\sum_{s=1}^{40} \text{diff}(40m+r, 40n+s)/1600$$

$$= \sum_{r=1}^{40}\sum_{s=1}^{40} [|g(40m+r, 40n+s) - f(40m+r, 40n+s)|]/1600$$

$$= \left|\sum_{r=1}^{40}\sum_{s=1}^{40} g(40m+r, 40n+s)/1600 - \sum_{r=1}^{40}\sum_{s=1}^{40} f(40m+r, 40n+s)/1600\right|$$

$$= |Mg(m, n) - Mf(m, n)|$$

So, the average value A(m,n) for each block 132 of the second image 126 is equal to the absolute value of the result of subtracting the corresponding mean value Mf (m,n) from the corresponding mean value Mg(m,n).

The first image 124 is generated before the view 102 is illuminated by a light source, and the second image 126 is generated when the view 102 is illuminated by the light source. Therefore, almost all of the mean values Mf(m,n) of the second image 126 are greater than the mean values Mg(m,n). When the calculator 130 calculates the average values A(m,n), an average value table 142 is used for recording the average values A(m,n). Each of the average values A(m,n) is displayed within a corresponding area of the table 142 that corresponds to one of the blocks 132. The average values A (m,n) are calculated according to the following equation:

$$A(m,n)=|Mg(m,n)-Mf(m,n)|.$$

After the average values A(m,n) are calculated, the calculator 130 calculates the mean difference B according the equation $$B = \left(\sum_{m=0}^{7}\sum_{n=0}^{5} A(m, n)\right) / (8 \times 6)$$

to obtain that the mean difference B is equal to thirty two, and then generates a contrast table 144 according the equation V(m,n)=|A(m,n)−B|. The contrast table 144 comprises a plurality of square blocks 147 for displaying the differences V(m,n). After the contrast table 144 is generated, the calculator 130 compares every differences V(m,n) with the threshold value S, i.e. S=13, so as to generate a flag table 146 and select the blocks 132 that have corresponding differences V(m,n) greater than the threshold value S. The flag table 146 comprises a plurality of square blocks 148. Each of the blocks 148 corresponds to a relative region of the first image 124 and the second image 126. Each of the blocks 148 that is indicated 1 corresponds to one of the blocks 132 having the differences V(m,n) greater than the threshold value S, and each of the blocks 148 that is indicated 0 corresponds to one of the blocks 132 having the differences V(m,n) not greater than the threshold value S. As shown in FIG. 9, because there is no block 132 having the difference V(m,n) greater than the threshold value S, the monitor system 100 determines that there is not any moving object in the view 102. Therefore, the global environment effects cannot influence the determination of the monitor system 100.

Please refer to FIG. 10. FIG. 10 represents a scene upon movement of an object near the right-bottom corner of the view 102. The calculator 130 compares the first image 124 with another second image 126B according to the previous method to detect moving objects. Similarly, the calculator 130 calculates the mean values Mg (m,n), the mean values Mf(m,n), the average values A(m,n), and the differences V(m,n), and generates another average value table 142B, another contrast table 144B, and another flag table 146B. Because an object moves near the right-bottom corner of the view 102 when the second image 126B is generated, the mean values Mf(m,n) displayed around the right-bottom corner of the second image 126B are greater than other mean values Mf(m,n) of the second image 126B, and the differences V(m,n) corresponding to the right-bottom corner of the second image 126B are greater than other differences V(m,n) indicated in the contrast table 144B. Finally, the calculator 130 determines that there is an object moving near the right-bottom of the view 102 according to the selected blocks 132 that having corresponding differences V(m,n) greater than the threshold value S.

Figure 11:
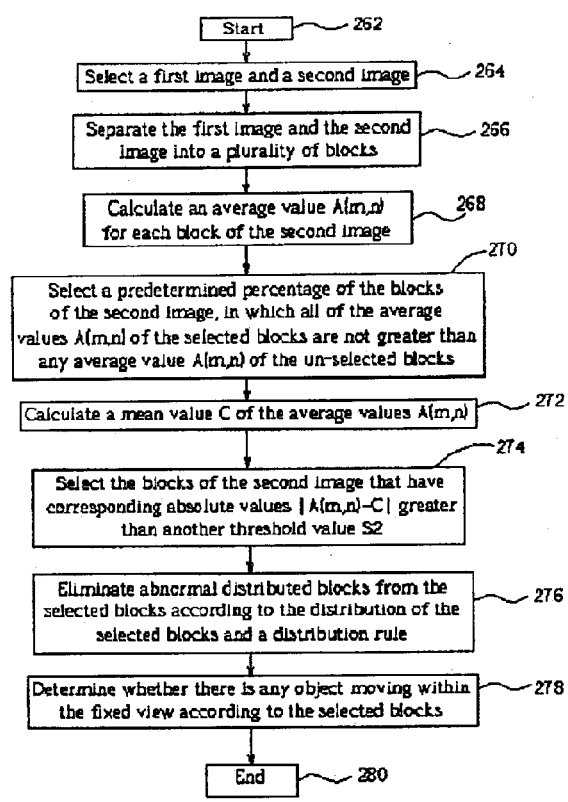
FIG. 11 is a flowchart of a method according to a second embodiment of the present invention.

Please refer to FIG. 11. FIG. 11 is a flowchart of a method according to a second embodiment of the present invention. In this embodiment, the calculator 130 adopts the following steps to compare the first image 124 with the second image 126:

Step 262: Start;

Step 264: Select a first image 124 and a second image 126 from the video image 122;

Step 266:

Separate the first image 124 and the second image 126 into a plurality of blocks 132;

Step 268:

Calculate an average value A(m,n) for each block 132 of the second image 126, each of the average values A(m,n) is equal to the average of the differences between pixels 134 of one of the blocks 132 of the second image 126 and pixels 134 of a corresponding block 132 of the first image 124;

Step 270:

Select a predetermined percentage, i.e. 50%, of the blocks 132 of the second image 126, in which all of the average values A(m,n) of the selected blocks 132 are not greater than any average value A(m,n) of the un-selected blocks 132;

Step 272:

Calculate a mean value C of the average values A(m,n) of the selected blocks 132;

Step 274:

Select the blocks 132 of the second image 126 that have corresponding absolute values |A(m,n)−C| greater than another threshold value S2;

Step 276:

Eliminate abnormal distributed blocks 132 from the selected blocks 132 according to the distribution of the selected blocks 132 and a distribution rule;

Step 278:

Determine whether there is any object moving within the fixed view 102 according to the selected blocks 132; and Step 280: End.

Because the calculator 130 sorts all of the blocks 132 of the second image 126 in ascending order by the average values A(m,n) before the predetermined percentage of the blocks 132 are selected, the calculator 130 can easily select the predetermined percentage of the blocks 132 where all of the average values A(m,n) of the selected blocks 132 are not greater than any average value A(m,n) of the un-selected blocks 132. In order to obtain the mean value C, the calculator 130 sums the average values A(m,n) of the selected blocks 132 up, and then divides the result by the number of the selected blocks 132. For example, the predetermined percentage is 50%, and the mean value C is equal to the average of the twenty four smaller average values A(m,n). The major characteristic of the second embodiment method is that only the predetermined percentage of the blocks 132 are selected to calculate the mean value C when the calculator 130 determines whether there is any moving object in the view 102. The advantage of this method is that the monitor system 100 can accurately detect whether there are any huge objects moving in the view 102. Because the movement of huge objects substantially influences the mean difference B, if the monitor system 100 detects moving objects by selecting the blocks 132 according to the equation V(m,n)=|A(m,n)−B|, the differences V(m,n) cannot actually respond to the difference between the moving object and the background. Therefore, in this embodiment, the mean value C replaces the mean difference B that is used in the first embodiment to represent the quantified global environment effects so that the accuracy for detecting huge moving objects is improved.

Figure 12:
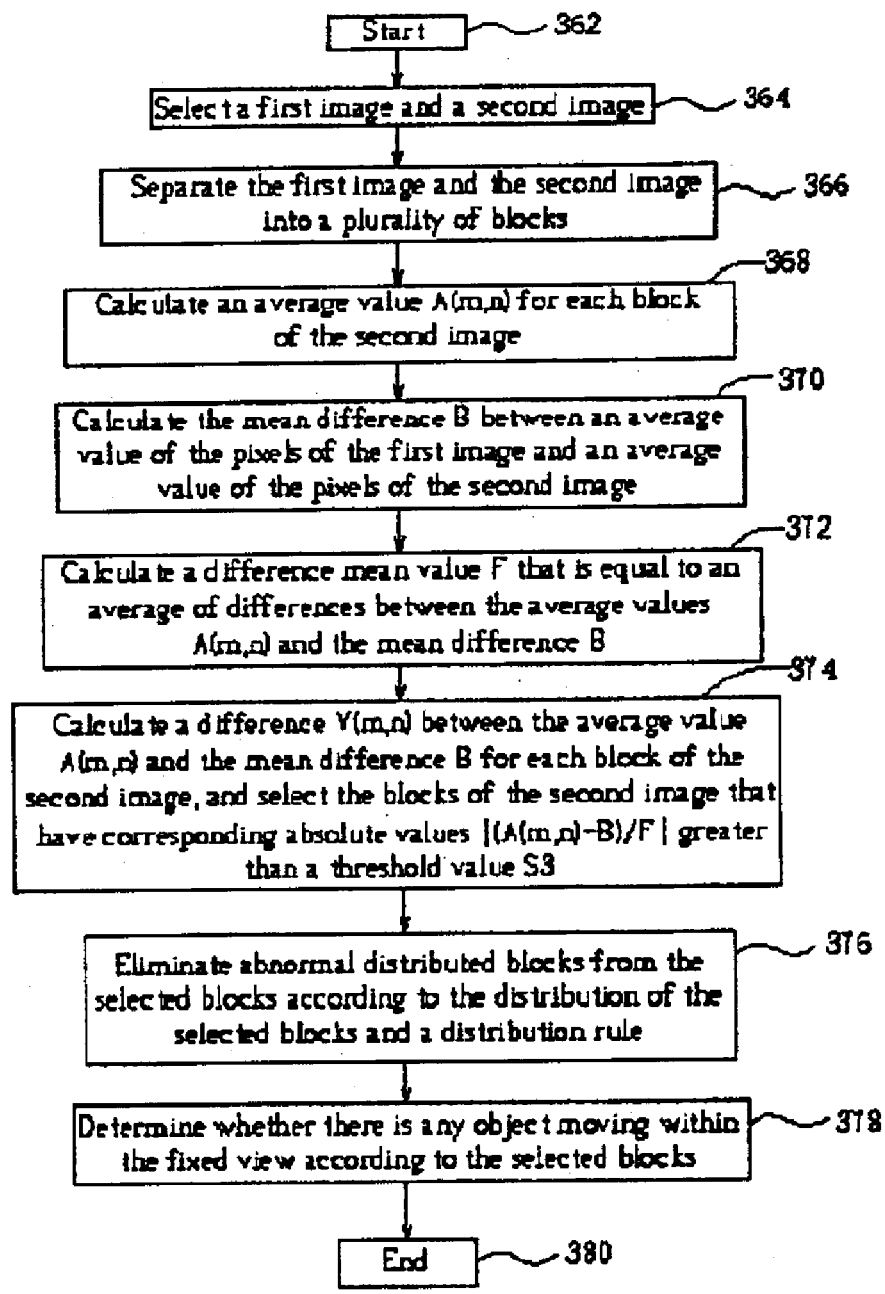
FIG. 12 is a flowchart of a method according to a third embodiment of the present invention.

Please refer to FIG. 12. FIG. 12 is a flowchart of a method according to a third embodiment of the present invention. In this embodiment, the calculator 130 adopts the following steps to compare the first image 124 with the second image 126:

Step 362: Start;

Step 364: Select a first image 124 and a second image 126 from the video image 122;

Step 366:

Separate the first image 124 and the second image 126 into a plurality of blocks 132;

Step 368:

Calculate an average value A(m,n) for each block 132 of the second image 126, each of the average values A(m,n) is equal to the average of the differences between pixels 134 of one of the blocks 132 of the second image 126 and pixels 134 of a corresponding block 132 of the first image 124;

Step 370:

Calculate the mean difference B between an average value of the pixels 134 of the first image 124 and an average value of the pixels 134 of the second image 126;

Step 372:

Calculate a difference mean value F that is equal to an average of differences between the average values A(m,n) and the mean difference B;

Step 374:

Calculate a difference V(m,n) between the average value A(m,n) and the mean difference B for each block 132 of the second image 126, and select the blocks 132 of the second image 126 that have corresponding absolute values |(A(m, n)B)/F| greater than a threshold value S3 (i.e. S3=1.2);

Step 376:

Eliminate abnormal distributed blocks 132 from the selected blocks 132 according to the distribution of the selected blocks 132 and a distribution rule;

Step 378:

Determine whether there is any object moving within the fixed view 102 according to the selected blocks 132; and Step 380: End.

The difference mean value F is defined as:

$$F = sum[|A(m, n) - B|]/(8 \times 6) = \left(\sum_{m=0}^{7}\sum_{n=0}^{5}|A(m, n) - B|\right)/(8 \times 6) = sum[V(m, n)]/(8 \times 6)$$

It is easy to find that the major difference between this embodiment and the first embodiment is that the calculator 130, in this embodiment, selects the blocks 132 that have corresponding absolute values |(A(m,n)B)/F| greater than a threshold value S3 to determine whether there is any moving object in the view 102. Please refer to FIG. 13. FIG. 13 represents a scene upon movement of an object near the right-bottom corner of the view 102. The calculator 130 compares the first image 124 with another second image 126C according to the third embodiment method to detect moving objects. Similarly, the calculator 130 calculates the mean values Mg(m,n), the mean values Mf (m,n), the average values A(m,n), and the differences V(m,n), and generates another average value table 142C, another contrast table 144C, and another flag table 146C. The numbers indicated in the first image 124, the second image 126C, the average value table 142C, and the contrast table 144C are copied from FIG. 10. FIG. 13 also depicts a standard deviation table 145 for displaying the corresponding absolute values |(A(m,n)B)/F| of the blocks 132 in relative positions. According to the equation F=sum[V(m,n)]/$_{(8\times6)}$, the difference mean value F is equal to 9.33. After the difference mean value F is calculated, the calculator 130 selects the blocks 132 that have corresponding absolute values |(A(m,n)B)/F| greater than the threshold value S3 (i.e. S3=1.2). As shown in FIG.13 and FIG. 10, the result of detection according to the third embodiment is the same as the result of the detection according to the first embodiment.

Figure 14:
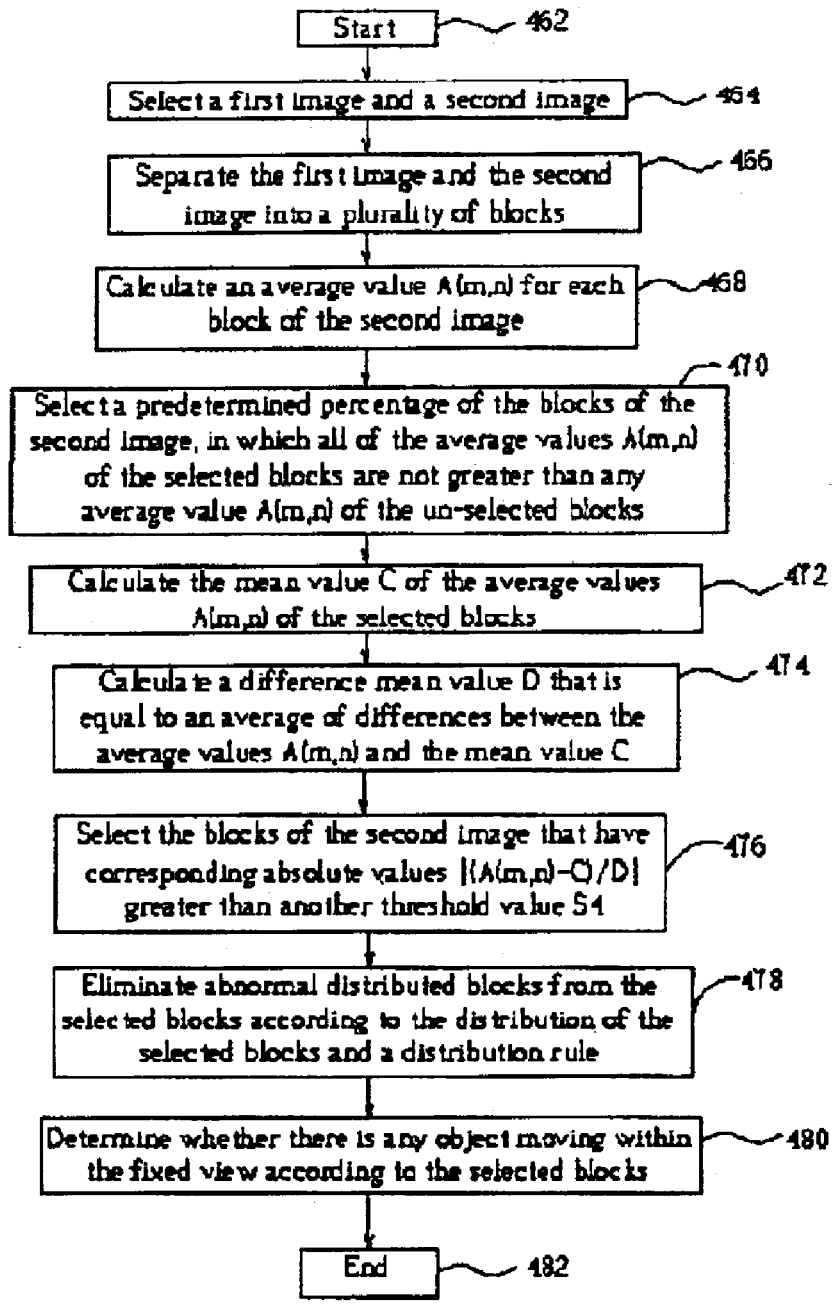
FIG. 14 is a flowchart of a method according to a fourth embodiment of the present invention.

Please refer to FIG. 14. FIG. 14 is a flowchart of a method according to a fourth embodiment of the present invention. In this embodiment, the calculator 130 adopts the following steps to compare the first image 124 with the second image 126:

Step 462: Start;

Step 464: Select a first image 124 and a second image 126 from the video image 122;

Step 466:

Separate the first image 124 and the second image 126 into a plurality of blocks 132;

Step 468:

Calculate an average value A(m,n) for each block 132 of the second image 126, each of the average values A(m,n) is equal to the average of the differences between pixels 134 of one of the blocks 132 of the second image 126 and pixels 134 of a corresponding block 132 of the first image 124;

Step 470:

Select a predetermined percentage, i.e. 50%, of the blocks 132 of the second image 126, in which all of the average values A(m,n) of the selected blocks 132 are not greater than any average value A(m,n) of the un-selected blocks 132;

Step 472:

Calculate the mean value C of the average values A(m,n) of the selected blocks 132;

Step 474:

Calculate a difference mean value D that is equal to an average of differences between the average values A(m,n) and the mean value C;

Step 476:

Select the blocks 132 of the second image 126 that have corresponding absolute values |(A(m,n)C)/D| greater than another threshold value S4;

Step 478:

Eliminate abnormal distributed blocks 132 from the selected blocks 132 according to the distribution of the selected blocks 132 and a distribution rule;

Step 480:

Determine whether there is any object moving within the fixed view 102 according to the selected blocks 132; and Step 482: End.

The difference mean value D is defined as:

$$D = sum[|A(m, n) - C|]/(8\times 6) = \left(\sum_{m=0}^{7}\sum_{n=0}^{5}|A(m, n) - C|\right)/(8\times 6)$$

It is not difficult to find that the major difference between this embodiment and the second embodiment is that the calculator 130 in this embodiment selects the blocks 132 that have corresponding absolute values |(A(m,n) B)/C| greater than a threshold value S4 to determine whether there is any moving object in the view 102.

As illustrated previously, the monitor system 100 is used for detecting moving objects within the view 102. However, the method of the present invention also can be used to detect moving objects within a specific field of the view 102 by comparing the first image 124 with the second image 126. The calculator 130 can select a detection area within the second image 126 that corresponds to the specific field of the view 102 to determine whether there is any object moving within the specific field. When the first image 124 is compared with the second images 126, the calculator 130 can calculate the average values A(m,n), the mean difference B, and the mean value, C etc., only according to the pixels 134 of the first image 124 and the second image 126 that correspond the specific field, and the other pixels 134 without the detection area are ignored. For example, the calculator 130 calculates the average values A of the blocks 132 within the detection area, the mean difference B between the average value of pixels of the second image within the detection area and the average value of corresponding pixels of the first image, and so on. Finally, the monitor system 100 can determine whether there is any object moving within the specific field of the view 102 according to the result obtained by the calculator 130.

In contrast to the prior art, the method of the present invention quantifies the global environment effects. When the global environment is changed suddenly, the monitor system adopting the method of the present invention still judges correctly.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for detecting activity within a fixed view by using a monitor system, the monitor system comprising a camera for filming the fixed view at a predetermined camera speed and a calculator for detecting the activity within the fixed view according to a first image and a second image generated by the camera, the second image being generated within a predetermined time interval after the first image is generated, each of the images generated by the camera comprising a plurality of blocks, each of the blocks comprising a plurality of pixels, the method comprising:

calculating an average value A for each block of the second image, each of the average values A is equal to an average of differences between pixels of one of the blocks of the second image and pixels of a corresponding block of the first image;

calculating a mean difference B between an average value of pixels of the first image and an average value of pixels of the second image;

calculating a difference V between the average value A and the mean difference B for each block of the second image, and selecting blocks of the second image that have corresponding differences V greater than a threshold value; and determining whether there is any object moving within the fixed view according to the selected blocks.

2. The method of claim 1 further comprising:

selecting a predetermined percentage of the blocks of the second image, wherein all of the average values A of the selected blocks are not greater than any average value A of the un-selected blocks;

calculating a mean value C of the average values A of the selected blocks; and selecting blocks of the second image that have corresponding absolute values |A−C| greater than the threshold value when the differences V are calculating.

3. The method of claim 2 further comprising:

calculating a difference mean value D that is equal to an average of differences between the average values A and the mean value C; and selecting blocks of the second image that have corresponding absolute values |(A C)/D| greater than the threshold value when the differences V are calculating.

4. The method of claim 1 further comprising:

calculating a difference mean value F that is equal to an average of differences between the average values A and the mean difference B; and selecting blocks of the second image that have corresponding absolute values |(A B)/F| greater than the threshold value when the differences V are calculating.

5. The method of claim 1 wherein each of the pixels comprises a plurality of image parameters, and the average values A and the mean difference B are calculated according to at least one of the image parameters.

6. The method of claim 5 wherein the image parameters include brightness, gray level, and color temperature.

7. The method of claim 1 wherein each of the pixels comprises a plurality of image parameters, and a representation value of each pixel can be obtained according to the image parameters, the average values A and the mean difference B being calculated according to the representation value of each pixel.

8. The method of claim 7 wherein the image parameters include brightness, gray level, and color temperature.

9. The method of claim 1 further comprising:

determining a moving area according to the selected blocks of the second image and a distribution rule for eliminating abnormal distributed blocks from the selected blocks.

10. The method of claim 1 wherein when any moving object is detected within the fixed view by the monitor system, the monitor system continues comparing the images generated by the camera to trace the moving object.

11. A method for detecting activity within a fixed view by using a monitor system, the monitor system comprising a camera for filming the fixed view at a predetermined camera speed and a calculator for detecting the activity within the fixed view according to a first image and a second image generated by the camera, the second image being generated within a predetermined time interval after the first image is generated, each of the images generated by the camera comprising a plurality of blocks, each of the blocks comprising a plurality of pixels, the method comprising:

selecting a detection area within the second image;

calculating an average value A for each block within the detection area, each of the average values A is equal to an average of differences between pixels of one of the blocks of the second image within the detection area and pixels of a corresponding block of the first image;

calculating a mean difference B between the average value of pixels of the second image within the detection area and the average value of corresponding pixels of the first image;

calculating a difference V between the average value A and the mean difference B for each block of the second image within the detection area, and selecting blocks of the second image within the detection area that have corresponding differences V greater than a threshold value; and determining whether there is any object moving within a field of the fixed view that corresponds to the detection area according to the selected blocks.

12. The method of claim 11 further comprising:

selecting a predetermined percentage of the blocks within the detection area, wherein all of the average values A of the selected blocks are not greater than any average value A of the un-selected blocks;

calculating a mean value C of the average values A of the selected blocks; and selecting blocks that have corresponding absolute values |A−C| greater than the threshold value within the detection area when the differences V are calculating.

13. The method of claim 12 further comprising:

calculating a difference mean value D that is equal to an average of differences between the average values A and the mean value C; and selecting blocks that have corresponding absolute values |(A C)/D| greater than the threshold value within the detection area when the differences V are calculating.

14. The method of claim 11 further comprising:

calculating a difference mean value F that is equal to an average of differences between the average values A and the mean difference B; and selecting blocks that have corresponding absolute values |(A B)/F| greater than the threshold value within the detection area when the differences V are calculating.

15. The method of claim 11 wherein each of the pixels comprises a plurality of image parameters, and the average values A and the mean difference B are calculated according to at least one of the image parameters.

16. The method of claim 15 wherein the image parameters include brightness, gray level, and color temperature.

17. The method of claim 11 wherein each of the pixels comprises a plurality of image parameters, and a representation value of each pixel can be obtained according to the image parameters, the average values A and the mean difference B being calculated according to the representation values of the pixels within the detection area.

18. The method of claim 17 wherein the image parameters include brightness, gray level, and color temperature.

19. The method of claim 11 further comprising:

determining a moving area according to the selected blocks within the detection area and a distribution rule for eliminating abnormal distributed blocks from the selected blocks.

20. The method of claim 11 wherein when any moving object is detected in the field that corresponds to the detection area by the monitor system, the monitor system continues comparing the images generated by the camera to trace the moving object.

* * * * *